UNITED STATES PATENT OFFICE.

JAMES D. DARLING, OF NEW YORK, N. Y., ASSIGNOR OF FIFTY-FIVE ONE-HUNDREDTHS TO ALFRED SIMS, ALEXANDER PYLE, WILLIAM LINDSAY, AND GEORGE F. BETTS, ALL OF SAME PLACE.

PROCESS OF PRODUCING ALUMINA.

SPECIFICATION forming part of Letters Patent No. 285,579, dated September 25, 1883.

Application filed January 29, 1883. (No specimens.)

*To all whom it may concern:*

Be it known that I, JAMES D. DARLING, of the city of New York, in the county of New York and State of New York, have invented a new and useful improvement in the process of obtaining alumina suitable for the manufacture of aluminium and other useful purposes; and I do hereby declare that the following is a full, clear, and exact description of the invention, which will enable others skilled in the art to which it appertains to make and use the same.

The method that has been for a long time used consists in dissolving the alum in water and precipitating the alumina by adding an excess of alkali to the solution. A gelatinous hydrated precipitate of alumina has been thus obtained, mingled with which are more or less impurities. This precipitate has been then subjected to a washing process, which, when continued for a considerable length of time—usually several months—frees it from these impurities sufficiently to make it alumina suitable to be manufactured into aluminium by the present well-known processes, and for other useful purposes. A patent has also been obtained by James Webster, dated January 31, 1882, and numbered 252,982, for an improvement in the production of alumina suitable for the manufacture of aluminium and other useful purposes, on reference to which the method employed by him will be found fully described.

In my method I take a given quantity of aluminium sulphate or ammonium alum, potash alum, sodium alum, or other salts or compounds of alum, and dissolve it in a sufficient quantity of water to form a concentrated solution. To this I add an excess of alkali, and by this means all the alumina contained in said solution is precipitated as a gelatinous hydrated precipitate of alumina mingled with impurities. This precipitate should be collected on a filter or other suitable apparatus for draining the same, and thus be drained and dried. I then submit this precipitate to a red heat, (1000° Fahrenheit and upward are recommended,) or any higher heat long enough to reduce it to a calcined oxide. I then wash this calcined oxide with water, which will, within a very short time in comparison with the old process above referred to, remove enough of the impurities to leave the alumina sufficiently pure to be manufactured into aluminium by the present well-known processes, and for other useful purposes. I would, however, recommend that ammonium alum or aluminium sulphate be used and the following process employed:

In producing the gelatinous hydrated precipitate from ammonium alum or from aluminium sulphate, I use as an alkali ammonia, and I recommend that this be used either in the form of concentrated liquid ammonia or by passing ammonia-gas through said solution. This precipitate I drain and dry in the manner already described, and then subject it to a red heat or any higher heat long enough to reduce it to a calcined oxide, and substantially drive off the sulphate of ammonia, which will generally require from fifteen minutes to a half-hour. The calcined oxide thus produced from ammonium alum or from aluminium sulphate is alumina sufficiently pure to be manufactured into aluminium by the present well-known processes, or for other useful purposes. The application of a red or any higher heat to the gelatinous hydrated precipitate obtained from ammonium alum or from aluminium sulphate for a long enough time produces a calcined oxide which is substantially free from sulphates, while the application of such heat, however, long applied, to the gelatinous hydrated precipitates of other alums simply produces a calcined oxide without driving off the sulphates.

I am aware that the above-described processes of precipitation of a gelatinous hydrated precipitate have been already used, and I hereby disclaim the same.

I am also aware that heat has been applied directly to ammonium alum and to aluminium sulphate for the purpose of producing alumina, and I disclaim such application.

I am also aware that heat has been applied to the above-described gelatinous hydrated precipitates for the purpose of expelling water from them, and I disclaim the application of heat or of a red or higher heat to said precipitates for that purpose.

I am also aware that the said gelatinous hydrated precipitates have been cleansed from sulphates and other impurities by leaching the same with water, and I disclaim any such use of water.

I am also aware that heat has been applied to the above-described gelatinous hydrated precipitates for the purpose of expelling water from them, and therefore disclaim this, as the expelling water from the hydrated precipitates by heat forms no part of my invention; but I believe that said application of heat to said gelatinous hydrated precipitate has never been continued long enough to expel from it the sulphate of ammonia contained therein.

I am also aware that gelatinous precipitates of aluminium have been first washed, then dried, and afterward ignited to whiteness; but this is essentially different from my process, for when the washing is done before the burning it takes months to wash any large quantity clear from its impurities, because the precipitate is a viscous tallowy substance, and in washing it the water finds great difficulty in permeating it, or even penetrating it, whereas in my process the precipitate is first converted by heat in a very short time—say a half-hour—into a solid granulated substance, which can be readily cleansed of all its impurities by means of two or three washings in water in a few minutes, however large, in reason, the quantity may be.

What I claim as my invention, and desire to secure by Letters Patent, is—

1. The improvement herein set forth in the art of obtaining alumina from ammonia alum, potash alum, sodium alum, or any of the salts or compounds of alum, or from aluminium sulphate, which consists, first, in forming therefrom a calcined oxide, and, secondly, leaching therefrom the sulphates or other impurities, substantially as described.

2. The improvement herein set forth in the art of obtaining alumina from ammonia alum, potash alum, sodium alum, or any salt or compound of alum, or from aluminium sulphate, which consists in, first, forming therefrom a gelatinous hydrated precipitate; secondly, in subjecting the precipitate to a suitable heat to convert it to a calcined oxide, and, thirdly, leaching therefrom the sulphates or other impurities, substantially as described.

3. The improvement herein set forth in the art of obtaining alumina from ammonia alum, potash alum, sodium alum, or any salt or compound of alum, or from aluminium sulphate, which consists in first forming therefrom a gelatinous hydrated precipitate; secondly, in subjecting said precipitate to a suitable heat for a sufficient length of time to convert it into a calcined oxide and remove therefrom the sulphate of ammonia contained therein; and, thirdly, leaching therefrom the remaining sulphates or other impurities, substantially as described.

JAMES D. DARLING.

Witnesses:
GEO. F. BETTS,
THOS. ALEXANDER, Jr.